UNITED STATES PATENT OFFICE.

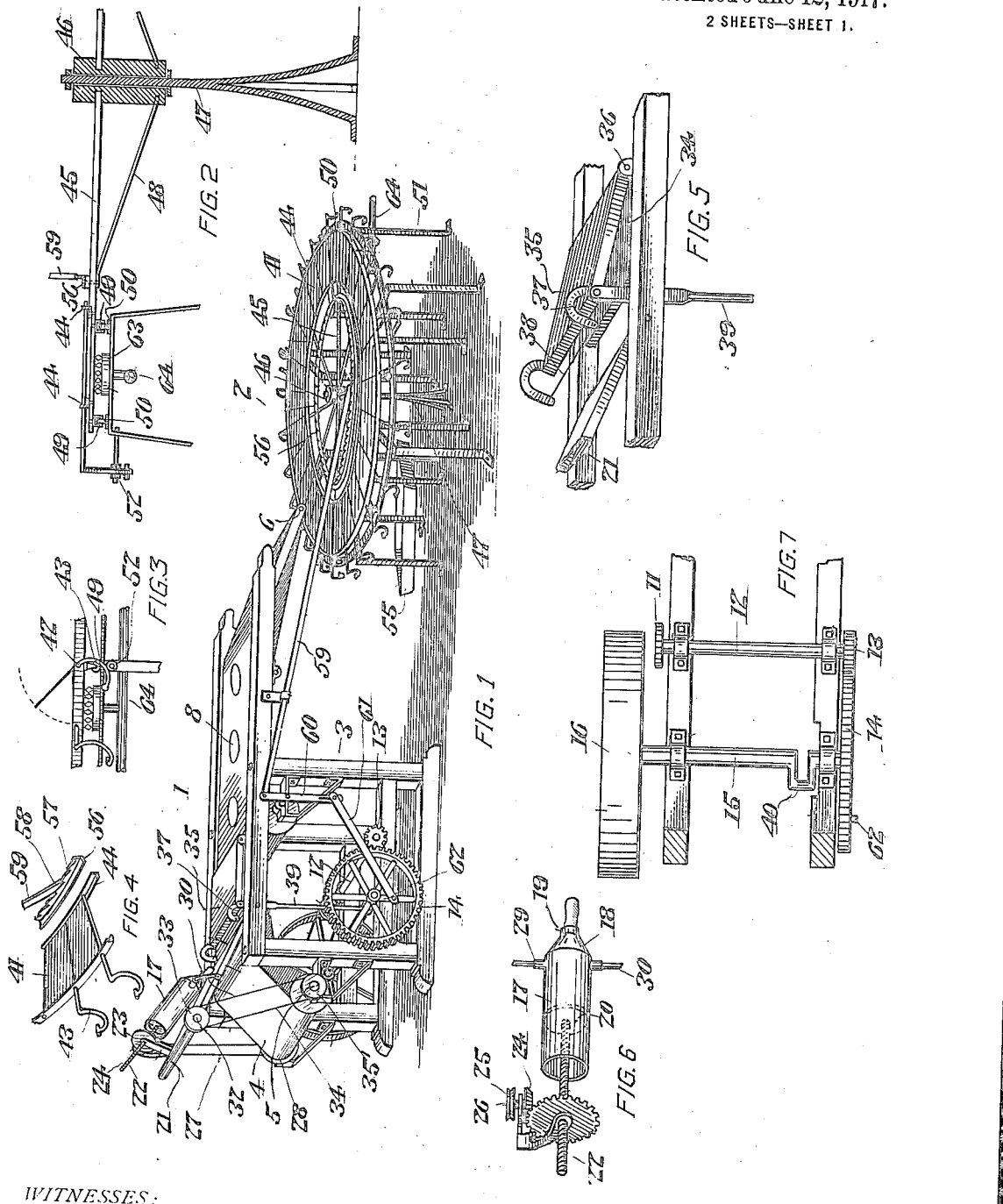
R. GUTIÉRREZ.
TORTILLA MAKING MACHINE.
APPLICATION FILED AUG. 30, 1916.
1,229,946.
Patented June 12, 1917.
2 SHEETS—SHEET 1.
WITNESSES:
INVENTOR.
Refugio Gutiérrez
BY Victor J. Evans
ATTORNEY

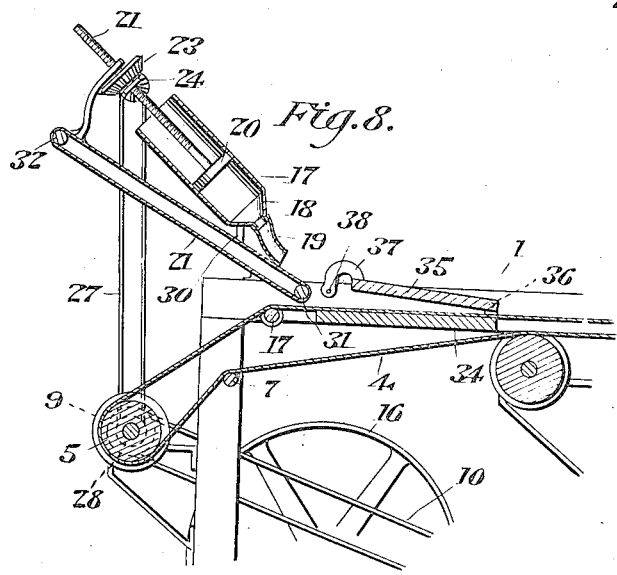
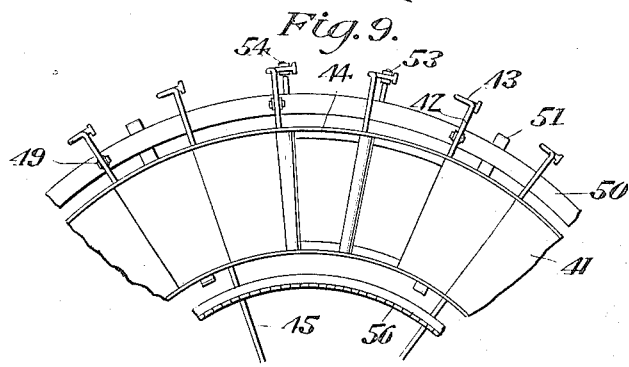
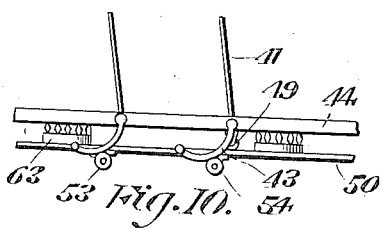

REFUGIO GUTIÉRREZ, OF SAN ANTONIO, TEXAS.

TORTILLA-MAKING MACHINE.

1,229,946. Specification of Letters Patent. Patented June 12, 1917.

Application filed August 30, 1916. Serial No. 117,749.

*To all whom it may concern:*

Be it known that I, REFUGIO GUTIÉRREZ, a citizen of Mexican Republic, residing at San Antonio, in the county of Bexar and State of Texas, have invented new and useful Improvements in Tortilla-Making Machines, of which the following is a specification.

This invention relates to a machine for making tortillas or similar kinds of cakes, the object of the invention being to provide a machine whereby food articles of this character may be easily, conveniently and rapidly produced.

The invention consists of the features of construction, combination and arrangement of parts hereinafter fully described and claimed, reference being had to the accompanying drawings in which:—

Figure 1 is a perspective view of a complete tortilla making machine embodying my invention.

Fig. 2 is a vertical transverse section, on an enlarged scale, through a portion of the rotary cooker.

Fig. 3 is a detail view in side elevation of a portion of the cooker and illustrating a tilting action of a cooking plate.

Fig. 4 is a detail perspective view of a portion of the cooker.

Fig. 5 is a detail perspective view showing particularly the press for flattening the dough into cakes, and also showing the dough supply apron and cutter.

Fig. 6 is a view of the dough hopper and feeder.

Fig. 7 is a plan view of the frame of the cake former showing the main elements of the drive gearing.

Fig. 8 is a vertical longitudinal section through the dough supply end of the tortilla form.

Fig. 9 is a sectional plan view of the cooker showing the cooking plates in the position they occupy in the operation of the apparatus.

Fig. 10 is a view showing the tilting actions of the plates on an enlarged scale.

In carrying my invention into practice, I provide a machine for making tortillas and similar cakes which comprises a cake former 1, by which the cakes are formed into proper shape from the dough, and a cake cooker 2, by which the formed cakes are cooked to the desired degree. These devices are combined in a single organization and are connected to operate in timed accord with each other.

The former 1 comprises a suitable frame structure 3 supporting a cake feed apron 4, which passes around the terminal shafts or rolls 5 and 6 and over suitably arranged intermediate guide rolls 7. The main portion of this apron extends horizontally, its upper stretch being adapted to receive the formed cakes 8, while the receiving and delivery ends of said belts are preferably arranged at an angle to the horizontal, to respectively dispose the said portions of the belt out of the way of the dough feeding mechanism and in position to deliver the formed cakes to the cooker. The shaft 5 carries a pulley 9 which is connected by a belt 10 with a pulley 11 on a horizontal transverse transmission shaft 12. This shaft 12 is provided with a pinion 13 meshing with a gear 14 on a main drive shaft 15, provided with a pulley 16 to receive motion from any suitable source of power, whereby the feed apron and other working parts of the apparatus are driven.

The dough from which the tortillas are formed is stored within a hopper 17 which is in the form of an elongated cylinder arranged in an inclined position above the receiving end of the apron 4, said cylinder being open at its upper rear end for the admission of the dough in the charging action and having its lower forward end provided with a frusto-conical portion 18 terminating in a reduced circular nozzle 19, through which the dough is adapted to be forced out in the form of a round strip, which is severed into sections and compressed to form cakes 8. A follower or plunger 20 is arranged to operate within the cylinder for feeding the dough outward through the nozzle upon a dough supply apron or conveyer 21, said follower being connected with a screw stem or shaft 22 receiving motion from a rotary gear nut 23 driven by a gear pinion 24, by means of which a given amount of the dough will be forced out of the nozzle in the form of a continuous circular column within a given time. The gear 24 is carried by a shaft 25 on which is a pulley 26 connected by a belt 27 with a pulley 28 on one end of the shaft 5, whereby said gear nut is driven at a regulated rate of speed. The gear nut and its driving parts are suitably mounted upon the frame 1, while the hopper or cylinder 17 is provided adjacent to its forward end with bearing sleeves 29 which engage bracket arms 30 upon the frame of the conveyer 21, whereby upon the withdrawal of the piston 20 after the exhaust of one charge of dough, the hopper may be tilted to a vertical position so as to be conveniently refilled. In practice, the piston may be forced backward by reversing the operation of the drive gearing in an obvious manner.

The dough supply apron or conveyer 21 is arranged at a suitable angle below the hopper and between the same and the receiving end of the apron 4, and passes around shafts or rollers 31 and 32, the shaft 32 carrying a pulley 33 connected by a belt 34 with a pulley 35' on the shaft 5, whereby said dough supply apron is driven.

The apron 21 delivers the column of dough to the upper stretch of the inner portion of the horizontal section of the apron 4 which passes over a bottom stationary press board 34 and between the same and a vertically movable press board 35. The press board 35 is hinged or pivoted to the frame 3, as at 36, and carries at its free end bracket arms 37 supporting a transverse cutter 38. This cutter 38 which is preferably in the form of a strand of wire, is vibrated or reciprocated up and down by the corresponding motion of the movable press board 35, so as to intermittently or periodically sever the feeding columns of dough into portions or sections which are then compressed by the action of the press board into flat cakes 8 of the prescribed size. The movable press board 35 is operated by a connecting rod 39 from a crank 40 on the shaft 15.

The cakes 8 are formed as described and disposed at regular intervals upon the upper stretch of the apron 4 and are conveyed by such stretch of the apron successively to and dropped upon the top portion of the rotary cooker or stove 2, which top portion of said cooker or stove is properly spaced from the apron for such action and is made in the form of an annular series of cooking plates 41, each secured along one of its transverse edges to a transverse rock shaft 42 having at one end a curved depending weighted trip arm 43. The respective rock shafts 42 are journaled in a carrier frame composed of spaced angle metal rings 44 fixed to a series of radial arms 45 connected with a central hub 46 mounted to rotate upon a bearing pedestal 47, said arms being reinforced from the hub by braces 48. The carrier frame as thus constructed is provided with rollers 49 to travel upon track rails 50 mounted upon a series of uprights 51 forming a base frame on which the rotary cooker revolves. The trip arms 43 of the radially arranged cooking plates 41 project outwardly beyond the line of the table and base frame and are arranged in the path of contact rollers 52, 53 and 54 journaled upon the base frame of the cooker, so that at proper points in the rotation of the cooker the cooking plates will be successively tilted independently and coöperatively, as hereinafter described, to flop each cake from one plate to another for a reversing or turning action and thereafter discharging the cooked cake into a suitable receiving pan or receptacle 55.

Fixed to the radial arms 45 of the rotary cooker is a circular rack bar 56, provided with teeth 57 of ratchet form engaged by the inclined end or tooth 58 of a reciprocating rod or bar 59, acting as a feed dog or pawl, said bar or rod being connected with one end of a rocker arm or lever 60, fulcrumed on the frame 3, the opposite end of which rocker arm or lever is slotted and slidably and pivotally connected with one end of a pitman rod 61 connected at its opposite end with a crank pin 62 on the gear 14, whereby the pawl will be reciprocated in timed accord with the feed action of the feed apron 4, to turn the cooker on each feed motion the distance of one tooth, corresponding to the distance between the centers of the cooking plates, whereby on each feed action a cooking plate will be moved out of receiving position with relation to the delivery end of the apron 4, and the next following cooking plate in the direction of rotation of the cooker brought into receiving position, thus providing for the successive delivery of the uncooked cakes as they are formed to the plates of the cooker for the cooking action.

Gas burners 63 are supported by the brackets 51 beneath the plates 41 to heat the same on their passage, and these burners are supplied with gas through a suitable supply pipe 64. In the operation of the machine, it will be evident that the dough will be forced out of the nozzle of the hopper on to the apron 21 and carried by such apron down between the presser boards 34 and 35 and beneath the cutter 38, whereby the dough will be severed into sections which will be pressed flat into cakes, and that the cakes so formed will be fed by the feeder 4 to the cooking plates of the rotary cooking device. As these plates are heated from the burners 63 it will be evident that the cakes will be rapidly cooked on one side during a portion of the rotation of the cooker. At this time the contact arm 43 of each plate as it comes into position for turning the cake, strikes the first contact roller 52 and is thereby tilted, as shown in Figs. 3 and 10, to flop the cake over upon the vacant plate in advance thereof from which a cake has been removed in the same manner or to the preceding plate, whereby the cake is turned, the tripped plate then swinging back to normal position through the gravital action of its weighted trip arm 43 to receive the cake from the next succeeding tilted plate as will be readily understood. The cake is then cooked on its reverse side as it travels in the remainder of the course of rotation of the table until the arm 43 associated therewith engages the contact roller 53, whereby the plate is swung to dumping position, as illustrated in Fig. 10, at which time the contact arm of the preceding plate from which the cake has been dumped will engage the contact roller 54 and thus swing the preceding plate to a vertical position to allow the cake discharged from the dumping plate to drop down into the receiver 55, the plate from which the cake has been dumped thence passing forward and being again tilted by the roller 54 to allow the cake from the following plate which is moved into dumping position to drop into the receiver, and so on, it being obvious from the foregoing description that each plate will receive its cake and cook one side thereof, will then be tilted to turn the cake on to another plate to be cooked on the other side thereof, will then move back to normal position and receive the turned cake from another plate, and will finally be tilted to dump the cake, allowing the operation to be quickly carried out. As a result, a large number of cakes may be formed and cooked within a minimum period of time and at a very low cost for labor and fuel, the advantages of which will be appreciated.

I claim:—

1. In a tortilla making machine, a cooker comprising a rotary cooking surface composed of a series of cooking plates, means for heating said plates, and means for tilting the plates to turn and dump the cakes.

2. In a machine for making tortillas, a cooker comprising a rotary body formed of an annular series of plates, means for heating said plates, means for tilting the plates to turn and dump the cakes, and means for intermittently turning the cooker.

3. In an apparatus for making tortillas, a cooker comprising a rotary stove having a cooking surface consisting of a series of spaced plates, means for heating said plates, means for tilting the same at prescribed intervals for cake turning and dumping operations, and pawl and rack mechanism for intermittently operating said stove.

4. In a machine for making tortillas, a rotary stove comprising an annular series of tilting plates, means for heating the plates, means for successively tilting each plate to turn the cake thereon on to another plate, means for subsequently tilting each plate to a dumping position, means for tilting the plate in advance of the dumping plate to a non-interfering position, and means for rotating the stove.

5. In a machine for making tortillas, a cooker having a cooking surface for successively receiving the cakes, and means for operating portions of said surface in the motion of the cooker for turning and discharging the cakes.

In testimony whereof I affix my signature.

REFUGIO GUTIÉRREZ.